United States Patent
Na et al.

(10) Patent No.: US 8,296,122 B2
(45) Date of Patent: Oct. 23, 2012

(54) EXTERNAL CONNECTION INTERFACE EMULATION APPARATUS AND METHOD FOR MOBILE TERMINAL

(75) Inventors: Sung Guk Na, Suwon-si (KR); Rae Jin Uh, Seoul (KR)

(73) Assignee: Samsung Electronics Co., Ltd (KR)

( * ) Notice: Subject to any disclaimer, the term of this patent is extended or adjusted under 35 U.S.C. 154(b) by 787 days.

(21) Appl. No.: 11/866,905

(22) Filed: Oct. 3, 2007

(65) Prior Publication Data

US 2008/0084897 A1   Apr. 10, 2008

(30) Foreign Application Priority Data

Oct. 9, 2006 (KR) .................. 10-2006-0097818

(51) Int. Cl.
*G06F 9/455* (2006.01)
(52) U.S. Cl. .......................... 703/24; 703/23
(58) Field of Classification Search .............. 703/27, 703/23–24
See application file for complete search history.

(56) References Cited

U.S. PATENT DOCUMENTS

| | | | |
|---|---|---|---|
| 6,625,640 | B1 | 9/2003 | Zou et al. |
| 7,512,402 | B2 * | 3/2009 | Narayanaswami et al. ... 455/420 |
| 2004/0122651 | A1 * | 6/2004 | Herle .............................. 703/27 |
| 2004/0172473 | A1 | 9/2004 | Lukas |
| 2004/0185777 | A1 * | 9/2004 | Bryson ......................... 455/41.1 |
| 2005/0249179 | A1 | 11/2005 | Yoshida |
| 2007/0155400 | A1 * | 7/2007 | Madsen ....................... 455/456.1 |
| 2007/0155422 | A1 * | 7/2007 | Johansen et al. ............ 455/556.1 |

FOREIGN PATENT DOCUMENTS

| | | |
|---|---|---|
| JP | 2005-318455 | 11/2005 |
| KR | 1020040007030 | 1/2004 |
| KR | 1020040007056 | 1/2004 |
| KR | 1020040073590 | 8/2004 |
| KR | 1020040079838 | 9/2004 |
| KR | 1020040098755 | 11/2004 |
| KR | 1020050062675 | 6/2005 |
| KR | 1020060047661 | 5/2006 |

OTHER PUBLICATIONS

Shin et al., "The Performance Comparison between WiBro and HSDPA"., 7-7 Sep. 2005, IEEE., p. 346-350.*
Lee et al. Jul. 2006, IEEE Communications Magazine., "The Wireless Broadband (WiBro) System for Broadband Wireless Internet Services", p. 106-112.*

* cited by examiner

*Primary Examiner* — Eunhee Kim
(74) *Attorney, Agent, or Firm* — The Farrell Law Firm, P.C.

(57) ABSTRACT

An external connection interface emulation method and apparatus of a mobile terminal for exploiting the mobile terminal as a network adaptor of another terminal are provided. The external connection interface emulation apparatus includes a network modem for supporting communication through the mobile communication system; and a controller, which configures the network modem for operating the mobile terminal as an external network adaptor of another terminal or a communication device as it is, according to an input signal. The external connection interface emulation apparatus and method establish a communication link between a WiBro modem and a USB port at the software level making it possible to use the mobile phone as an external modem regardless of whether the WiBro modem and the USB port are compatible or not.

17 Claims, 3 Drawing Sheets

EXTERNAL CONNECTION INTERFACE EMULATION APPARATUS AND METHOD FOR MOBILE TERMINAL

PRIORITY

This application claims priority to an application entitled "EXTERNAL CONNECTION INTERFACE EMULATION APPARATUS AND METHOD FOR MOBILE TERMINAL" filed in the Korean Intellectual Property Office on Oct. 9, 2006 and assigned Serial No. 2006-0097818, the contents of which are incorporated herein by reference.

BACKGROUND OF THE INVENTION

1. Field of the Invention

The present invention relates to a mobile terminal of a communication system and, in particular, to an external connection interface emulation method and apparatus for a mobile terminal for exploiting the mobile terminal as a network adaptor of another terminal.

2. Description of the Related Art

Technological advancements and rising usage of mobile communication have dramatically influenced people's everyday life. As a result of these technological advancements, mobile communication devices are becoming ever more popular and widely accepted for data communications as well as for conventional voice communications.

Wireless Broadband (WiBro) is a wireless broadband Internet technology developed for satisfying mobile user's demands for wireless voice and data communication. WiBro provides the user with voice and data connectivity anytime and anywhere even on the move.

WiBro operates in the 2.3 GHz band and covers about 1 Km range. WiBro supports high-speed data service indoor, outdoor stationary, pedestrian-speed, and below-60 Km/h mobile environments. WiBro also provides high speed and reliable Internet service at low cost relative to other communication networks.

Recently, various handheld devices such as Personal Digital Assistants (PDAs) and Smart phones are equipped with a Wireless Local Area Network (WLAN) or WiBro module. Code Division Multiple Access (CDMA) and Global System for Mobile communication (GSM) phones equipped with the WiBro module have emerged.

In order to access the Internet using WiBro service, the user needs a WiBro-enabled device, or the user could purchase a WiBro communication modem if the user already has a portable terminal, which does not support WiBro.

If the user has a WiBro-enabled handheld terminal and wants to access the Internet using another terminal that does not support WiBro, then additional cost may be incurred for accessing the Internet using the WiBro service.

Regarding CDMA, in order to access a CDMA network using a terminal such as a laptop computer that does not support CDMA communication, a USB modem emulation technique for connecting a CDMA phone to the laptop computer through a universal serial bus (USB) cable has been proposed.

FIG. 1 is a block diagram illustrating a configuration of a conventional USB connection between two terminals. In FIG. 1, a laptop computer 110 and a CDMA phone 120 having respective USB ports 111 and 121 are connected with each other. CDMA phone 120 includes a CDMA modem 123 for processing incoming and outgoing signals through a CDMA network and a USB client module 125. The client module 125 couples USB port 121 with CDMA modem 123. USB client module 125 and USB port 121 are matched through the USB interface.

However, a conventional WiBro modem does not support the USB connection, making a USB connection-based WiBro service impossible, since pins of the USB client module cannot be directly connected to a WiBro modem. Particularly, some WiBro services requiring an authentication process using an identification card such as a Universal Subscriber Identification Module (USIM) may not be served using a direct USB connection.

SUMMARY OF THE INVENTION

The present invention has been made in an effort to solve the above problems, and it is an aspect of the present invention to provide an external connection interface emulation apparatus and method for a mobile terminal that are capable of logically connecting a network modem to an external connection interface regardless of physical matching between the network modem and the external connection interface.

In accordance with an aspect of the present invention, an external connection interface emulation apparatus for a mobile terminal of a mobile communication system accomplishes the above and other objects. The external connection interface emulation apparatus of the present invention includes a network modem for supporting communication through the mobile communication system; and a controller, which configures the network modem for operating the mobile terminal as an external network adaptor of another terminal or a communication device, according to an input signal.

Preferably, the network modem includes a miniport driver and a stream driver. The network modem activates the miniport driver if the input signal is a modem initialization signal.

Preferably, the controller relays data between the network modem and the other terminal while the stream driver is activated. The controller includes a stream driver for operating the network modem as a relay member for relaying data between the mobile communication system and the other terminal; an external connection interface driver for enabling the other terminal to recognize the external interface as the external network adaptor; and a relay driver for relaying data between the stream driver and the external connection interface driver.

Preferably, the external connection interface emulation apparatus further includes a Universal Subscriber Identity Module (USIM) for providing subscriber information when the mobile terminal accesses a service requiring authentication. The USIM includes a USIM driver for providing subscriber information stored in the USIM through a relay driver.

Preferably, the controller includes a stream driver for operating the network modem as a relay member for relaying data between the mobile communication system and the other terminal; an external connection interface driver for enabling the other terminal to recognize the external interface as the external network adaptor; a relay driver for relaying data between the stream driver and the external connection interface driver; and a USIM driver for providing subscriber information stored in the USIM through a relay driver.

Preferably, the network modem is a wireless broadband (WiBro) modem.

Preferably, the controller controls the mobile terminal to a USB modem, a Bluetooth modem, and an IrDA modem.

In accordance with another aspect of the present invention, the above and other objects are accomplished by an external connection interface emulation apparatus of a mobile terminal having a Universal Serial Bus (USB) port for connecting to another terminal. The external connection interface emulation apparatus includes a network modem for communicating through an access system, the network modem having a stream driver for relaying data between the access system and the USB port, and a controller for operating the mobile terminal as a USB modem of the other terminal, which communicates with the access system according to a signal output from the other terminal.

Preferably, the external connection interface emulation apparatus further includes a Universal Subscriber Identity Module (USIM) containing subscriber information, which is provided through the stream driver when another terminal accesses a service requiring an authentication.

In accordance with another aspect of the present invention, an external connection interface emulation apparatus of a mobile terminal connected to another terminal accomplishes the above and other objects. The external connection interface emulation apparatus includes an external connection interface having at least one connection port for connection to the other terminal, a network modem for communicating with an access system, a controller for operating the network modem as an external modem according to a signal input from the other terminal, and a switch for configuring signal lines between the external connection interface and the network modem.

Preferably, the external connection interface includes a Universal Serial Bus (USB) port, a Bluetooth port, and an IrDA port.

In accordance with another aspect of the present invention, the above and other objects are accomplished by an external connection interface emulation method for a mobile terminal that is connected to another terminal through the external connection interface. The external connection interface emulation method includes determining whether an event occurs at the external connection interface, and operating the mobile terminal as a network adaptor of the other terminal or another communication device according to the outcome of the above determination step.

Preferably, the external connection interface emulation method further includes disabling the miniport driver and enabling the stream driver if the event is a modem initialization event.

Preferably, the external connection interface emulation method further includes relaying data between the other terminal and the access system while the stream driver is activated.

Preferably, the external connection interface emulation method further includes providing subscriber information when the other terminal accesses a service requiring an authentication.

Preferably, operating the mobile terminal as a network adaptor includes determining whether the other terminal sources the event; and emulating the mobile terminal as a network adaptor.

Preferably, emulating the mobile terminal includes configuring the mobile terminal to be recognized as a network adaptor.

Preferably, emulating the mobile terminal includes writing incoming data from the other terminal to the mobile terminal, writing data to the other terminal, and transferring the subscriber information to the other device, according to an input command.

Preferably, emulating the mobile terminal includes operating the mobile terminal as a network adaptor if the event is input from the other terminal; and relaying data between the other terminal and the access system.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

An external connection interface emulation device and method for a mobile terminal according to the present invention connect a network modem and an external connection interface at the system driver level of the mobile terminal such that a connection of an external device through the external connection interface is set inside the mobile terminal.

The external connection interface emulation method and apparatus are described with a mobile terminal equipped with a WiBro modem as an example. However, the present invention is not limited to the WiBro mobile terminal, but can be adapted to the mobile terminals operated on the basis of various communication standards such as Code Division Multiple Access (CDMA), Global System for Mobile communication (GSM), Universal Mobile Telecommunications System (UMTS), and Wireless Local Area Network (WLAN), etc.

The present invention is described using a mobile terminal equipped with an external connection interface emulation apparatus for illustrative purposes. The mobile terminal is connected to a laptop computer for exploiting the mobile terminal as a USB modem supporting the WiBro service. The laptop computer can be replaced by a Cellular phone, Smart phone, PDA, or Personal Computer (PC) having USB ports.

The external connection interface emulates a USB connection as an example. However, the external connection interface can emulate Bluetooth and Infrared Data Association (IrDA) connections.

Figure 1:
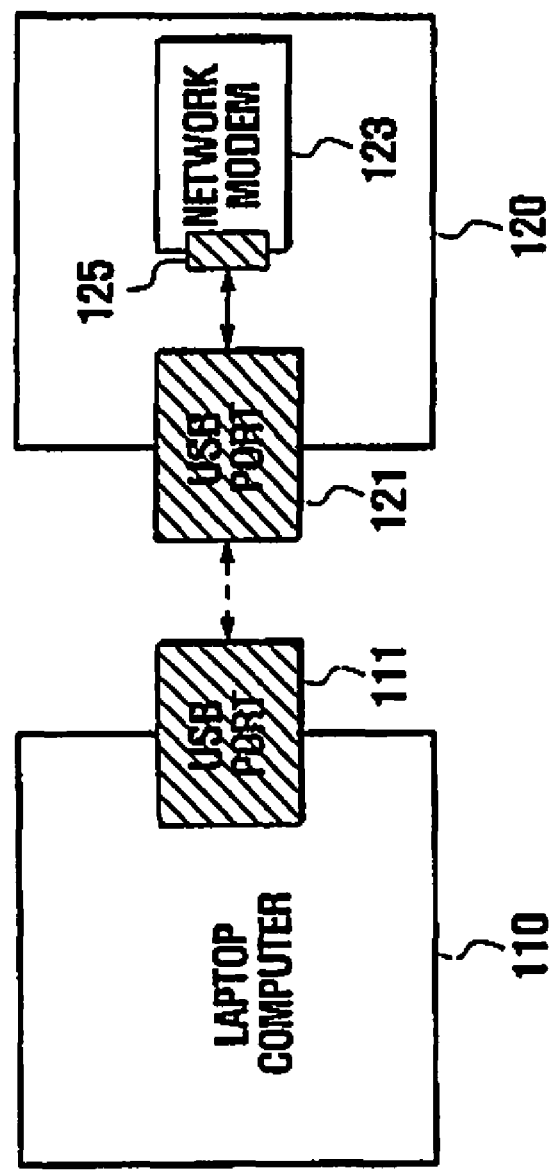
FIG. 1 is a block diagram illustrating a configuration of a conventional direct USB connection between two terminals.
Figure 2:
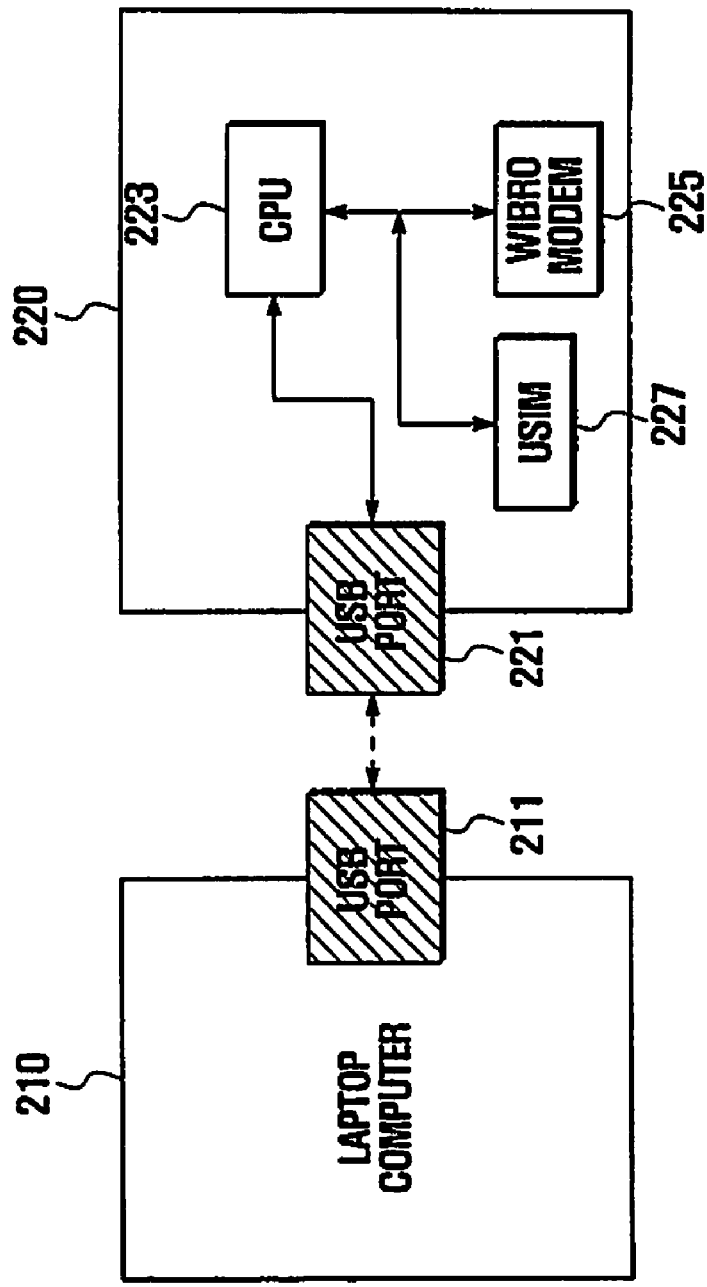
FIG. 2 is a block diagram illustrating a USB connection emulation system according to the present invention.

Referring to FIG. 2, a USB connection emulation system according to an exemplary embodiment of the present invention includes a mobile terminal 220 and a laptop computer 210. Laptop computer 210 and the mobile terminal 220 are configured with respective USB ports 211 and 221 for connecting laptop computer 210 and mobile terminal 220 through a USB cable.

Mobile terminal 220 includes a USB emulation device having a central processing unit 223, a WiBro modem 225, and USIM 227. USIM 227 is included in the USB emulation device for supporting authentication and accounting functions. Accordingly, the USIM can be removed if the mobile terminal does not have the authentication and accounting functions.

In order for the mobile terminal to operate as a USB modem for supporting the WiBro communication, several software modules are required. The software modules include a network modem driver (for example, XP miniport driver), an external interface driver (for example, a USB client driver), a terminal modem driver (for example, a Personal Computer Memory Card International Association (PCMCIA) driver), an interface relay driver, and a modem management program.

For example, the USB connection emulation of the present invention is performed by controlling interoperation between the network modem (WiBro modem in this embodiment) and the external interface (USB port in this embodiment) in a software level (for example, in system driver level) such that the external connection is regarded as a direct connection to the internal network modem.

In order to implement this mechanism, the network modem driver, external interface driver, terminal modem driver, interface relay driver, and modem management program are required.

The external interface driver relays signals between USB port 221 and WiBro modem 225.

Each driver for operating mobile terminal 220 is implemented as a stream driver rather than a miniport driver, such that the modem stream driver activates the external interface driver as a stream driver for relaying incoming data through WiBro modem 225. A relay driver relays the data input through USB port 221 to WiBro modem 225. In this manner, mobile terminal 220 operates as a USB modem.

Accordingly, laptop computer 210 should be provided with a miniport driver corresponding to USB port 221 of mobile terminal 220 so as to recognize mobile terminal 220 connected through USB port 221 as a network card (i.e. WiBro adaptor card).

The operations of the respective software modules are described hereinafter in more detail.

The modem management program controls WiBro modem 225 such that mobile terminal 220 operates in an active mode or a passive mode. When WiBro modem 225 operates in the active mode, mobile terminal 220 acts as a WiBro communication device, and when WiBro modem 225 operates in the passive mode, mobile terminal 220 acts as a WiBro adaptor card of laptop computer 210. In order to set WiBro modem 225 for operating mobile terminal 220 in the passive mode, the modem management program loads the stream driver rather than the miniport driver. The modem management program executes the external interface driver for activating the external interface, i.e. USB port 221, and initiates the relay driver such that CPU 223 controls a data relay between WiBro modem 225 and USB port 221.

The terminal modem driver consists of a miniport modem driver and stream modem driver and relays packets between WiBro modem 225 and USB port 221 in cooperation with the stream modem driver. At this time, the modem management program controls to disable the miniport modem driver and to enable the stream modem driver for enabling the packet relay.

The external interface driver allows laptop computer 210 to recognize mobile terminal 220 as a USB modem for WiBro communication when mobile terminal 220 is connected to laptop computer 210, and thus an interface relay driver operates as the stream driver for exchanging data through USB port 221.

The interface relay driver can be implemented in two ways. In the first, a relay function is embedded in the terminal modem driver such that the terminal modem driver can interoperate with the external interface driver for exchanging the data. In the second, the interface relay driver is implemented as a separate driver that can activate the external interface driver and the external modem driver at the same time such that the interface relay driver is only responsible for the data relay. When USIM 227 is used, the interface relay driver activates a USIM driver such that USIM 227 can be accessed through the external interface driver.

The external modem driver controls WiBro modem 225 such that mobile terminal 220 operates as a USB modem for WiBro communication in the passive mode. In this case, mobile terminal 220 is set such that laptop computer 210 or other external device recognize USB port 221 of mobile terminal 220 as a WiBro adaptor card. The external modem driver activates the miniport driver for WiBro modem so as to enable a communication through WiBro modem 225 of mobile terminal 220.

Figure 3:
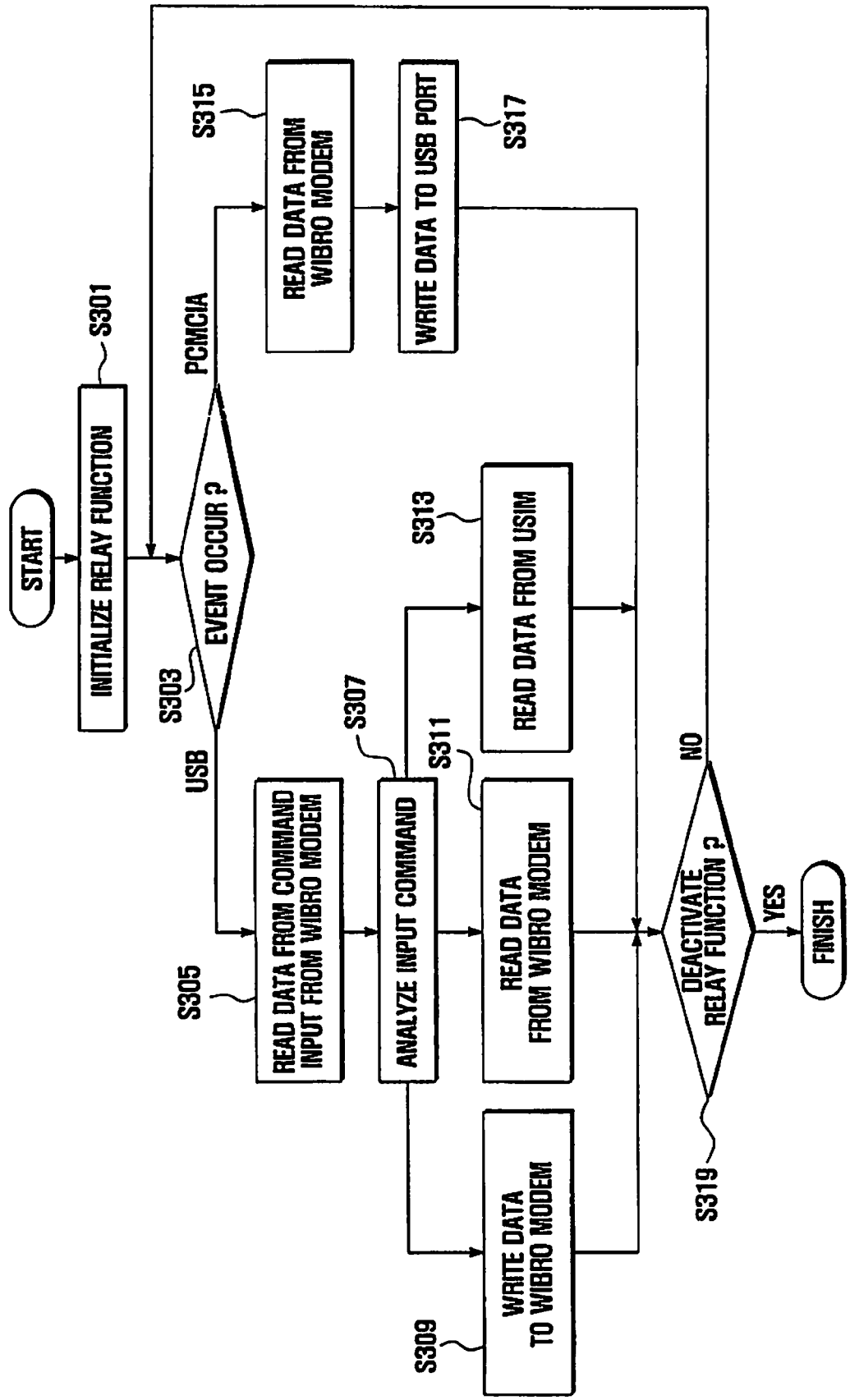
FIG. 3 is a flowchart of a connection interface emulation method according to the present invention.

The connection interface emulation method is described with a mobile terminal equipped with a USIM, with reference to FIG. 3.

Referring to FIG. 3, if a relay function is initiated in step S301, when an event occurs, the mobile terminal analyzes the event and determines whether the event is a USB-related event or a PCMCIA-related event in step S303.

If the event is a USB-related event, the mobile terminal reads a command input from the WiBro modem in step S305 and analyses the input command in step S307. According to the input command, the mobile terminal writes data to the WiBro modem in step S309, reads data from the WiBro modem in step S311, or reads data from the USIM in step S313.

If the event is a PCMCIA-related event, the mobile terminal reads data from the WiBro modem in step S315 and then writes the data to the USB port in step S317. After processing the event, if the relay function is not deactivated, the process returns to steps S303 and S319.

When an identification card such as the USIM is used, it is preferred that the relay driver activates the USIM driver so as to access the USIM thorough the external interface driver. In this case, the mobile terminal is set to be recognized as a WiBro adaptor card by the laptop computer, such that the external modem driver is configured as a miniport driver associated with the WiBro adaptor card for supporting WiBro service through WiBro modem 225.

As described above, the external connection interface emulation apparatus and method of the present invention establish a communication link between a WiBro modem and a USB port at the software level, making it is possible to use a mobile phone as an external modem regardless of whether the WiBro modem and the USB port are compatible or not.

Also, the external connection interface emulation apparatus of the present invention allows a mobile terminal to be used as a network card for other terminal making it is possible to avoid incurring the expense of buying an additional network card.

Also, since the external connection interface emulation apparatus of the present invention connects the network modem and the external connection interface to each other at the software level, it is possible to efficiently support the usage of a USIM for the purposes of authentication and accounting services.

Although preferred embodiments of the present invention have been described in detail, it should be clearly understood that an artisan of ordinary skill in the art may perform many variations and/or modifications of the basic inventive concepts herein taught which, will still fall within the spirit and scope of the present invention, as further defined by the appended claims.

What is claimed is:

1. An external connection interface emulation apparatus for a mobile terminal of a wireless broadband (WiBro) communication system, the apparatus comprising:
an external connection interface having at least one connection port for connection to a laptop computer;
a WiBro modem for supporting communication through the WiBro communication system, with the WiBro modem including a miniport driver for supporting WiBro communication of the mobile terminal and a stream driver for supporting WiBro communication of the laptop computer through the mobile terminal when the mobile terminal is connected to the laptop computer, wherein the stream driver relays data between the WiBro communication system and a Universal Serial Bus (USB) port; and
a controller, which configures the WiBro modem for operating the mobile terminal as an external network adaptor of the laptop computer or the WiBro modem for supporting WiBro communication of the mobile terminal, according to an input signal,
wherein the WiBro modem and the external connection interface logically connect the WiBro modem to the external connection interface regardless of physical matching between the WiBro modem and the external connection interface.

2. The external connection interface emulation apparatus of claim 1, wherein the WiBro modem disables the miniport driver and enables the stream driver if the input signal is a modem initialization signal.

3. The external connection interface emulation apparatus of claim 2, wherein the controller relays data between the WiBro modem and the laptop computer while the stream driver is operating.

4. The external connection interface emulation apparatus of claim 1, wherein the controller comprises:
the stream driver for operating the WiBro modem as a relay member for relaying data between the WiBro communication system and the laptop computer;
an external connection interface driver for enabling the laptop computer to recognize the external interface as the external network adaptor; and
a relay driver for relaying data between the stream driver and the external connection interface driver.

5. The external connection interface emulation apparatus of claim 1, further comprising a Universal Subscriber Identity Module (USIM) containing subscriber information, which is provided through the stream driver when the mobile terminal accesses a service requiring authentication.

6. The external connection interface emulation apparatus of claim 5, wherein the USIM comprises a USIM driver for providing subscriber information stored in the USIM through a relay driver.

7. The external connection interface emulation apparatus of claim 5, wherein the controller comprises:
the stream driver for operating the WiBro modem as a relay member for relaying data between the WiBro communication system and the laptop computer;
an external connection interface driver for enabling the laptop computer to recognize the external interface as the external network adaptor;
a relay driver for relaying the data between the stream driver and the external connection interface driver; and
a USIM driver for providing subscriber information stored in the USIM through the relay driver.

8. The external connection interface emulation apparatus of claim 1, wherein the controller controls the mobile terminal to emulate one of a USB modem, a Bluetooth modem, and an IrDA modem.

9. The external connection interface emulation apparatus of claim 1, further comprising a switch for configuring signal lines between the external connection interface and the WiBro modem.

10. The external connection interface emulation apparatus of claim 1, wherein the external connection interface comprises one of the USB port, a Bluetooth port, and an IrDA port.

11. An external connection interface emulation method for a mobile terminal of an access system that is connected to another terminal through an external connection interface, the method comprising:
determining whether an event occurs at the external connection interface;
operating the mobile terminal as a network adaptor of the other terminal, according to the event input through the external connection interface; and
disabling, in a wireless broadband (WiBro) modem, a miniport driver for supporting WiBro communication of the mobile terminal and enabling a stream driver for supporting WiBro communication of the other terminal through the mobile terminal when the mobile terminal is connected to the other terminal if the event is a modem initialization event,
wherein the WiBro modem and the external connection interface logically connect the WiBro modem to the external connection interface regardless of physical matching between the WiBro modem and the external connection interface.

12. The external connection interface emulation method of claim 11, further comprising relaying data between the other terminal and the access system while the stream driver is operating.

13. The external connection interface emulation method of claim 12, further comprising providing subscriber information when the other terminal accesses a service requiring authentication.

14. The external connection interface emulation method of claim 11, wherein operating the mobile terminal as a network adaptor comprises:
determining if the terminal initiates the event; and
emulating the mobile terminal as a network adaptor.

15. The external connection interface emulation method of claim 14, wherein emulating a network adaptor comprises configuring the mobile terminal to be recognized as a network adaptor.

16. The external connection interface emulation method of claim 14, wherein emulating a network adaptor comprises writing incoming data from the other terminal to the mobile terminal, writing data to the other terminal, and transferring subscriber information to the other device, according to an input command.

17. The external connection interface emulation method of claim 14, wherein emulating the network adaptor comprises:
operating the mobile terminal as a network adaptor if the event is issued by the other terminal; and
relaying data between the other terminal and the access system.

* * * * *